ABSTRACT OF THE DISCLOSURE

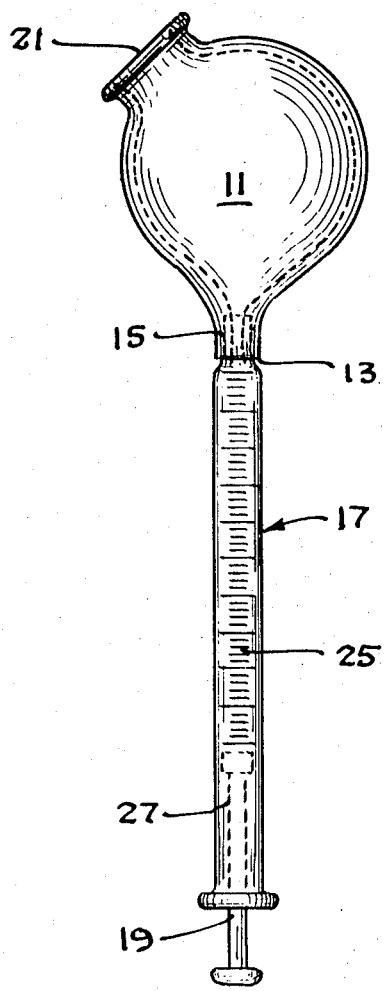
Inventors
Charles J. Overbeck
Jay C. Means
By Johnston, Root, O'Keeffe, Keil,
Thompson & Shurtleff
Attorneys އ
3,626,751
DEVICE AND METHOD FOR MEASURING OIL IN WATER
Charles J. Overbeck, Palos Heights, and Jay C. Means, River Forest, Ill., assignors to Nalco Chemical Company, Chicago, Ill.
Filed Dec. 11, 1969, Ser. No. 884,229
Int. Cl. G01n 33/18, 25/14
U.S. Cl. 73—61.1 R                                  6 Claims

A device and method for the convenient analytical determination of oil-in-waste water using a funnel-syringe device and a low boiling solvent.

INTRODUCTION

With increasing involvement in pollution control and waste water analysis, there is an express need for a procedure for determining the amount of oil-in-waste water, suitable for field use. For this to be convenient, the equipment must be sturdy and the procedure must be relatively quick. A detection limit of 10 p.p.m. is desired. Several approaches have been tried for the analysis of oil-in-waste water. Included are spectro-photometric methods, optical diffusion methods, gravimetric methods, volumetric methods, colorimetric methods and chemical methods. Most procedures involve solvent extraction.

Spectrophotometric methods depend on infrared or ultra-violet adsorption. These approaches naturally require instrumentation and this method is incapable of detecting lower homologs of the aromatic series. Ultra-violet adsorption has the advantage of being able to be done directly on the water sample. In addition, rugged, UV monitoring instruments are available for this purpose. Dependence upon transmissions, however, subjects the method to a few interferences, primarily turbidity. Variations in the type of hydrocarbon present will also affect the results. For a fairly consistent type of water, the instrument has useful application, but for a wide variety of waste water analysis, the accuracy of the results would be doubtful.

Other photometric methods depend on fluorescence. Measurement of fluorescence can be done with a fluorometer or by visual comparison with a standard. Oils, however, have a wide range of fluoroscence characteristics ranging in color and intensity. Again, a procedure based on this property can be devised for a specific water, but serious errors arise when atempting to do it to a wide variety of samples. Previous work done in this field indicated no reliable correlation between fluorescence and the amount of oil present in the water.

Several optical methods for measuring oil in water use three kinds of instruments: turbidimeter, nephelometer, and the tyndalmeter, which depend on apparent absorbents, reflectants, and the scattering of light respectively. Each of these is subject to interference with other suspended material, and there is the problem of free oil which floats or adheres to the sides of the sample holder.

Classical approaches for oil-in-water analysis are refinements of the basic principle of extracting the oil from the water sample with a suitable solvent, evaporating the solvent to dryness, then weighing the residue. Solvents commonly used are hexane, ether, petroleum ether, chloroform, and carbon tetrachloride. For field use this approach is unsatisfactory because a sensitive analytical balance is required. In addition prolonged drying time is involved.

A remaining possibility is volumetric measurement of the oil after extraction and evaporation.

An approach used in the past for a volumetric measurement of residual oil after extraction and evaporation of solvent is given in API methods 732–53, "The Determination of Non-Volatile Oily Matter." The problem with this method is that a centrifuge was necessary. Since centrifuging is not practical in the field, other approaches had to be tried. Furthermore, occasionally the evaporation was too rapid, and the entire sample would blow out the tube.

OBJECTS

It was an object of this invention to develop a field method for the determination of oil-in-waste water in concentrations of 10 parts per million and above.

It was a further object to make the test convenient to be run, avoiding the use of delicate instrumentation, so that the test could be readily adapted to field use.

It was another object of this invention to devise a device that could be conveniently transported for field use for determining the amount of oil-in-waste water.

Further methods will be obvious to those skilled in the art.

THE INVENTION

This invention comprises a volumetric measurement of oil-in-waste water. The apparatus consists of a bulb and a measuring device in an inverted position. A syringe is the measuring device. After extraction of the sample, the solvent is evaporated to approximately 10 milliliters. It is then transferred to the apparatus having a special bulb or funnel on top and an inverted syringe fitted to the bulb or funnel. The evaporation is completed in the funnel using a hot water bath and the residual oil drawn into the syringe and measured. It is better to draw the oil into the syringe while a little solvent remains so that sufficient fluidity is retained. Evaporation is completed in the syringe with the plunger fully extended. The oil is collected by pushing in the plunger until the oil is near the top of the measuring area. The reading is then made.

This invention can be better understood by reference to the drawing.

THE DRAWING

The apparatus is shown in the drawing. The pear-shaped top 11 has a capacity of approximately 17 milliliters with an offset addition opening 21 so that if the sample "popped" due to rapid heating, the sample will be retained. The pear-shaped top 11 has an outlet 13 which is connected to the tapered neck 15 of the syringe 17 in a sealing relationship. The syringe 17 has calibrations 25. The syringe consists of a glass barrel 27 tightly fitted with a plunger 19. The syringe is a 500 microliter syringe consisting of divisions of 10 microliters. The pear-shaped top 11 has an offset opening 21 to receive the sample.

In the use of this apparatus the extracted sample is poured into the pear-shaped top 11 through the offset addition opening 21. The sample drops to the neck 15 of the syringe 17. The entire apparatus is then placed in a hot water bath where a Freon solvent is evaporated. The apparatus is then taken out of the hot water bath. The plunger is pulled out to allow the oil to flow through the neck 15 and into the glass barrel 27. The apparatus is then placed back in the hot water bath so that the remaining solvent can be evaporated. When all of the solvent has been evaporated the volume of the oil can be measured by the calibrations 25 of the syringe 17.

It should be understood that various modifications can be made in the apparatus without substantially departing from the subject matter of the invention. For instance, the capacity of the pear-shaped top and the syringe can be larger or smaller than shown in the drawing. Preferably, the tapered neck 15 of the syringe 17 and the outlet 13 can be eliminated by using a one piece construction. Thus the bulb and the syringe would be the top and bottom of a one piece device. In this way, there will be no loss due to any leakage from any connection, and furthermore, any hindrance of oil flow will be reduced.

OPERATION OF THE DEVICE

Briefly stated, the water sample is extracted with Freon. The extraction solvent is evaporated in a beaker to a volume of approximately 10 milliliters. The solvent is transferred to a device having a bulb or funnel fitted on an inverted syringe. Evaporation of the solvent is completed by placing the device in a hot water bath. The syringe plunger is fully inserted during most of the evaporation. The residual oil is then drawn into the calibrated area of the syringe, and the last traces of solvent are evaporated as before. After cooling, the oil is collected by pushing the plunger up until the oil is near the top of the measuring area. The measurement reading is then made.

The method consists of the following steps:

(1) the sample is extracted with Freon to form a Freon-oil mixture;
(2) the Freon-oil mixture is evaporated to a suitable volume using a heating means to boil off the Freon;
(3) transferring the mixture to the apparatus shown and concentrating the Freon-oil mixture by evaporating off some of the Freon;
(4) evaporating the remaining solvent using hot water; and
(5) the volumetric measurement of oil matter in the syringe portion of the apparatus.

The solvent used was trichlorotrifluoroethane, commonly called Freon-PCA. This was found to perform extremely well in oil and grease extraction. Any solvent that extracts the oil efficiently and can be easily evaporated at low temperatures could be used. Any suitable heating means could be used for evaporating the Freon. For example, a hot water bath could be used. Preferably, a heating mantle designed to fit the bottom of the funnel with an opening for the syringe could be used.

The following table tests the extraction efficiency of the Freon.

|  | Sample | | |
| --- | --- | --- | --- |
|  | I | II | III |
| SAE 20 motor oil added | 0.3920 G | 0.2098 G | 0.0887 G |
| Percent recovered: | | | |
| First extraction | 96.3 | 96.4 | 94.2 |
| Second extraction | 4.1 | 2.8 | 2.9 |
| Third extraction | 0.1 | 0.1 | 0.7 |
| Total percent recovered | 100.5 | 99.3 | 97.8 |

These results indicate very good recoveries, and two extractions are sufficient for most purposes.

This method depends on volumetric measurement of the oil remaining after extraction and evaporation. A specifically designed syringe is used for this purpose.

This invention can be better understood by reference to the following example.

EXAMPLE

Some SAE 20 motor oil was dissolved in Freon so that a 10 milliliter sample would yield a suitable residue of oil. The hot water bath was a thousand milliliter beaker filled to the top, the temperature maintained at about 160° F. on a hot plate. A wire triangle was used to support the funnel syringe. Several runs of 10 milliliter aliquots were made to obtain an evaluation of the technique and its productivity and its reproducibility. The various runs are given below.

| Run No.: | Volume oil found, microliters |
| --- | --- |
| 1 | 95 |
| 2 | 95 |
| 3 | 80 |
| 4 | 92 |
| 5 | 88 |
| 6 | 98 |
| 7 | 80 |
| 8 | 98 |
| 9 | 95 |

The results were encouraging. In Runs 3 and 7 all of the solvent was allowed to evaporate before withdrawing the oil into the syringe. Some of the oil remained on the shoulder of the syringe-funnel connection. This is a design problem that can be overcome. During evaporation in the funnel, enough washing action is obtained so that no oil clings to the upper funnel walls. Eliminating Runs 3 and 7, the reproducibility is very good. Evaporation of 10 milliliters of solvent under conditions used seldom exceeded 10 minutes. Only once was the sample "popped" out of the syringe because of too rapid heating and this could have been easily prevented.

SUMMARY

Determination of oil by volumetric measurement using the funnel-syringe device requires little equipment and manipulation and is less complicated than standard methods. Although other solvents could be used, Freon is the preferred solvent. The primary advantage of the Freon is its low boiling point (48° C.) facilitating the convenience of the evaporation.

Freon-PCA is heavier than water having a specific gravity of 1.58. It is non-flammable. Its solubility in water is 0.017% by weight at 20° C.

What is claimed and desired to be protected by Letters Patent is:

1. A method for the volumetric determination of oil-in-waste water comprising the steps of:
   (A) extracting a sample with a low boiling solvent;
   (B) evaporating the resulting oil-solvent mixture to a suitable volume;
   (C) transferring the concentrated oil-solvent mixture to a bulb-syringe apparatus;
   (D) evaporation of the remaining solvent using suitable heating means; and
   (E) measuring volumetrically the oily matter in the syringe portion of the bulb-syringe apparatus.

2. The method of claim 1 in which the low boiling solvent is trichlorotrifluorethane.

3. The method of claim 1 in which the heating means is a hot water bath.

4. The method of claim 1 in which the heating means is a heating mantle.

5. An apparatus for determining the volumetric measurement of oil extracted from water which comprises a top portion of substantially spherical shape having a first opening adapted to receive a small portion of an oil which has been solvent extracted from water, and opposite to said first opening a second opening which communicates with a cylindrical transparent extension which extends therefrom with graduations on the extension and a plunger slidable within the extension.

6. The apparatus of claim 5 in which the first opening is offset in relation to the second opening.

References Cited

UNITED STATES PATENTS

| | | | |
|---|---|---|---|
| 2,170,411 | 8/1939 | Jacobs et al. | 23—259 |
| 3,192,764 | 7/1965 | Jasek | 73—61.1 R |
| 3,364,731 | 1/1968 | Hook | 73—61.3 |
| 3,528,775 | 9/1970 | O'Hara et al. | 23—230 HC |

LOUIS R. PRINCE, Primary Examiner

J. W. ROSKOS, Assistant Examiner

U.S. Cl. X.R.

23—230 R, 259, 292; 73—61.3